2,868,820
PREPARATION OF HEXAORGANODISTANNOX-
ANE AND TRIORGANOTIN HYDROXIDE

Siegfried Nitzsche and Rudolf Riedle, Burghausen, Oberbayern, Germany, assignors to Wacker Chemie G. m. b. H., Munich, Germany No Drawing. Application May 2, 1955
Serial No. 505,509

Claims priority, application Germany May 8, 1954

8 Claims. (Cl. 260—429.7)

The present invention relates to an improved method for the preparation of triorganotin hydroxides and/or hexaorganodistannoxanes.

Triorganotin hydroxides are generally prepared by saponifying the corresponding triorganotin halides. These hydroxides can be isolated as such if desired, or they can be dehydrated concurrently and simultaneously with their production to produce the corresponding hexaorganodistannoxanes, e. g. $2R_3SnCl \rightarrow 2R_3SnOH \rightarrow R_3SnOSnR_3$.

Triorganotin hydroxides and hexaorganodistannoxanes have both been suggested as stabilizers for halogen containing polymers such as polyvinylchloride. Their utilization for this purpose, however, has heretofore been limited because their method of preparation has been unsatisfactory and too uneconomical for any commercial scale production.

Ordinarily the hydrolysis and dehydration of triorganotin halides has been carried out by the reaction of an ether solution of said halides with an aqueous solution of an alkali metal hydroxide. This reaction does not go to completion and the yields are very poor, particularly if the halide employed is a chloride, which is the only halide which is economically practical on a commercial basis. It has now been found that if one carries out this reaction in a homogeneous phase, e. g. by using alcohols as solvent, and if one heats the solution being hydrolyzed in order to drive the reaction further toward completion, the yield of product can be increased substantially. This yield, however, is still too low to be satisfactory and undesirable side reactions take place to even a greater extent.

From the method described above, only about 20 to 50 percent of the theoretical amount of product can be obtained. The yield of organotin products in which the organic radical contains more than two carbon atoms is particularly bad, for the higher temperatures and longer reaction times necessary for maximum completion of the hydrolysis bring about the decomposition of the product and cleavage of the organic radicals from tin. Decomposition of this type brings about the formation of an insoluble precipitate (A) which heretofore has not been utilized.

The problems of the prior art in this regard have been further complicated by the fact that triorganotin halides cannot be prepared in pure form except with the very greatest of difficulty. In the usual methods of preparation, e. g. by use of the Grignard reaction on tin tetrahalide or by the method of Kotscheschkow, there are always considerable amounts of tetraorganotin and diorganotin dihalides present in the reaction mixture along with the desired triorganotin halides, and separation of the products is very difficult. During the saponification of this mixture, the diorganotin dihalides precipipate out as polymeric diorganotin oxide (B). Both this precipitate and the precipitate (A) mentioned above are insoluble in water and in all usual organic solvents. In the ordinary preparation of hexaorganodistannoxane and/or of triorganotin hydroxide, precipitates of both the (A) and (B) type discussed above will be formed.

By working up (e. g. filtering and distilling) the hydrolysis or saponification products of the triorganotin halide intermediates, 4 distinct fractions can be isolated: (1) triorganotin hydroxide, which can be isolated per se or simultaneously converted to the corresponding hexaorganodistannoxane; (2) depending upon the operating conditions; (3) a "pre-run" or fore-cut containing unsaponified triorganotin halide and tetraorganotin, which are very difficult to separate; and (4) the insoluble precipitate containing both the decomposition products formed during hydrolysis and condensation and the diorganotin oxide formed from diorganotin halides present in the triorganotin halide intermediate.

In accordance with the present invention the preparation of triorganotin hydroxides and/or hexaorganodistannoxanes is improved to where it becomes economically and commercially feasible. We have found that a greatly increased yield can be obtained by carrying out the saponification as discussed above of an organotin halide mixture comprising triorganotin halide (along with any other organotin halides and tetraorganotin which may be present) and then separating the insoluble precipitate (type A and/or B) from the saponification product. A fraction (C) containing any unsaponified organotin halides and tetraorganotin is then separated, e. g. by distillation, solvent extraction, or crystallization, from the triorganotin hydroxide and/or hexaorganodistannoxane products in the liquid portion of the saponification product. One then contacts the aforesaid insoluble precipitate (A and B) with HCl and separates the organotin chlorides so formed, which are mixed with the aforesaid unsaponified organotin halide-tetraorganotin fraction (C). One then heats this mixture at a temperature of from 150° to 240° C., saponifies the latter reaction product, and then separates the resulting triorganotin hydroxide and/or hexaorganodistannoxane. By the continuous reworking of the by-products A, B, and C above in the described manner, the present invention avoids the necessity of using pure triorganotin halides as starting materials and makes use of heretofore discarded by-products.

According to the invention the insoluble precipitate (A and B discussed above) is converted into a mixture of organotin chlorides by treatment with HCl. Merely contacting HCl with the precipitates in question is ordinarily sufficient, and no particular conditions of temperature and concentration are necessary. Obviously, however, it is expedient to employ sufficient HCl and to allow a sufficient contact time to allow the reaction mixture to reach an equilibrium which produces the maximum possible amount of organotin chlorides. Either gaseous HCl or aqueous HCl can be used in this step. If aqueous HCl is employed, it is preferable that it have a concentration of from 15 to 40 percent HCl by weight, i. e. from semi concentrated to concentrated solutions. Lower concentrations can be employed if desired, but are found to be impractical from the standpoint of reaction time. Ordinarily any reaction temperature can be employed, for the reaction is quite exothermic even at room temperature. Practical considerations make it preferable to maintain the reaction temperature below the boiling point of any aqueous HCl employed. If gaseous HCl is used, the precipitate can be reacted in the dry state or as suspended in an inert organic solvent. When gaseous HCl is used, it is preferable for safety's sake to use an apparatus which is able to withstand the pressure that may evolve during the reaction. As far as the reaction itself is concerned, however, it makes no difference whether atmospheric or superatmospheric pressures are employed.

As described above, the organotin chlorides obtained from the insoluble precipitate reaction with HCl are combined with the mixture of material which can be obtained as a fore-cut in the distillation of the liquid products from the original saponification or hydrolysis reaction. This fore-cut contains unsaponified triorganotin halide (along with any other unsaponified tin halides which may be present) and tetraorganotin. The total halogen content of this new mixture usually lies quite close to the theoretical value calculated for the corresponding triorganotin halide. If the mixture varies to any great extent from this calculated amount, it is usually desirable to correct the composition of the mixture by the addition of more tetraorganotin if the halogen content is too high or by the addition of diorganotin dihalide, organotin trihalide, and/or tin tetrahalide if the halogen content is too low. In other words, it is preferable to adjust the Sn/halogen ratio to about 1.

The mixture, either with or without the presence of additional tin compounds to correct the average halogen content, can be reacted by heating the mixture to 150° to 240° C. in accordance with the Kotscheschkow method or the mixture can be recycled to a production unit in which the Kostcheschkow reaction is being carried out upon fresh intermediates. In any regard, the triorganotin halide so produced is again subjected to saponification and, if desired, to dehydration.

The Kotscheschkow reaction described above is well described in the literature [see Berichte 66, 1661 (1933)]. Illustrative reactions of this type are as follows, where R is an organic radical and X is halogen:

1.             $3R_4Sn + SnX_4 \rightarrow 4R_3SnX$
2.             $R_4Sn + R_2SnX_2 \rightarrow 2R_3SnX$
3.             $R_4Sn + SnX_4 \rightarrow 2R_2SnX_2$ Processes of the Kotscheschkow type are preferred for the preparation of the triorganotin halide used in the initial saponification step, and it is a variation of this reaction which is employed in reworking the insoluble precipitate-HCl reaction product as combined with the above described fore-cut and any organotin halides which might be added to correct the halogen to tin ratio of the mixture. The preferred reaction temperature for conducting the Kotscheschkow type of reaction is from 200 to 220° C. At temperatures below 150° C., the rate of reaction is too slow for practical operations whereas at temperatures much above 240° C., a noticeable decomposition of the organotin compound takes place. Superatmospheric pressure is not ordinarily necessary in this type of reaction but can be used if desired to raise the boiling point when lower boiling materials such as methyltin chlorides are being employed. The Kotscheschkow reaction is preferably carried out in a glass, enamel, or porcelain lined vessel equipped with a stirring device, and the reaction is preferably conducted under nitrogen.

In a single recycling according to this invention yields of 60 to 70 percent of theoretical are obtained. By repeatedly reworking and recycling the by-products in accordance with this invention, it is possible to increase the yields of product to about 90 percent of theoretical. If the reaction is carried out in a closed cycle, the maximum yield is determined mainly by the normal operating losses.

A major economic advantage of the method of this invention lies in the fact that the saponification of the triorganotin halides need not be carried out under severe conditions but can be interrupted at a point where both time and heat energy are conserved and where the formation of by-products is at a minimum, with the unreacted material being recycled.

In the organotin compounds employed and obtained in this invention, the tin bonded organic radicals (R) can be aliphatic, alicyclic, aromatic, or heterocyclic in nature. Examples of suitable aliphatic radicals are methyl, ethyl, propyl, isopropyl, butyl, isobutyl, t-butyl, amyl, isoamyl, t-amyl, hexyl, heptyl, octyl, dodecyl, 2-ethylbutyl, 2-ethyl-hexyl, etc. Suitable aryl radicals are phenyl, tolyl, xylyl, and naphthyl. Cyclohexyl and thienyl are illustrative of the alicyclic and heterocyclic radicals which can be present. The compounds of primary interest are those in which the organic radicals are butyl, isobutyl and t-butyl.

Any of the organotin halides can be employed, but the invention is primarily concerned with the bromides and chlorides. The chlorides, of course, are the only economically practical materials at the present time.

Saponification of the organotin halides is well known in the art. It can be carried out by contacting the halides with an alkali metal hydroxide, particularly NaOH or KOH, at room temperature. Preferably, however, this step is carried out with alcoholic alkali metal hydroxide or with aqueous alkali metal hydroxide in the presence of a mutual solvent such as an alcohol, e. g. ethanol. The reaction mass is preferably, but not necessarily, heated.

The following examples are illustrative only.

Example 1

868 g. crude tributyltin chloride, obtained by heating 694 g. tetrabutyl tin and 174 g. tin tetrachloride at 210°, were dissolved in 2 l. ethyl alcohol and refluxed with 300 cc. 50% sodium hydroxide for four hours. Then the alcohol was distilled out, the residue filtered to remove the precipitate and the filtrate was fractionally distilled. 318 g. of a mixture of tetrabutyl tin and tributyltin chloride was obtained as a fore-cut boiling at 140–200° C. at 10 mm. Hg. At 220 to 230° C./10 mm. Hg, the desired hexabutyldistannoxane distilled over in an amount of 261 g., which corresponds to a yield of 32.5% of theory based on the reactant tin compound.

The precipitate which had been filtered off (about 230 g.), was suspended in 600 cc. benzene, and thoroughly mixed with 600 cc. concentrated HCl at room temperature. The mixture was allowed to separate and the benzene layer was decanted. After evaporation of the benzene, there remained a waxy soft mass which was added to the fore-cut. There was thus obtained 503 g. of an organotin chloride mixture with a chlorine content of 11.5%. The theoretical calculated value for $Bu_3SnCl$ is 10.9% chlorine. This mixture was then heated for six hours at 210° according to the method of Kotscheschkow and then further worked up as above. There was thus obtained 128 g. precipitate, 186 g. fore-cut and 164 g. hexabutyldistannoxane. The yield of the latter brought the total yield to 53%.

When the precipitate and pre-run were again subjected to the same treatment, 112 g. hexbutyldistannoxane was obtained. The total yield was thus 67% compared to only 32.5% when the precipitate is discarded.

Example 2

550 g. pure distilled tributyltin chloride were saponified by 12 hours refluxing in 2 l. 10% alcoholic sodium hydroxide. The resultant precipitate was filtered off, washed with alcohol, and the total alcohol distilled off. Fractionation of the remaining filtrate yielded 152 g. fore-cut (containing 4.3% chlorine) and 263 g. hexabutyldistannoxane, B. P. 164–174°/0.1 mm. Hg, $n_D^{20}$ 1.4872. This corresponds to a yield of 52% of theory.

The precipitate which was filtered off was suspended in 200 cc. trichloroethylene and gaseous HCl was introduced therein at room temperature. When the solution was saturated, it was filtered and the solvent evaporated. The remaining crystal slurry was combined with the fore-cut. 232 g. of a mixture containing 10.6% chlorine was thus obtained. This mixture was heated for four hours at 210° C. and finally saponified with excess alcoholic lye. After working-up as above, there was obtained 51 g. fore-cut, 25 g. precipitate and 129 g. hexabutyldistannoxane, which brought the total yield to 78%.

A second identical operation yielded 56 g. hexabutyldistannoxane whereby the total yield was 89% of theory based on the reactant tin compound, compared to only 52% if the fore-cut and precipitate are not further worked up.

Example 3

100 g. crude triethyltin chloride was refluxed for six hours in 500 cc. 10% alcoholic sodium hydroxide. The precipitate was filtered off and the filtrate fractionated. At 96° to 146° C./12 mm. Hg, 44 g. fore-cut containing 1.6% chlorine was obtained and at 146° to 147° C./12 mm. Hg, the hexaethyldistannoxane was obtained, $n_D^{20}=1.4975$; yield 35 g.=39% theory.

The precipitate was stirred up with white gasoline and gaseous HCl was introduced. When the reaction was complete, the cloudiness was filtered off and the solvent distilled off. After combining with the fore-cut, 56 g. of a mixture containing 8.1% chlorine was obtained. In order to obtain the 14.7% theoretical value calculated for triethyltin chloride, 9.4 g. tin tetrachloride were added. The reaction mixture was then further worked up as described in Examples 1 and 2, whereby 26 g. hexaethyldistannoxane were obtained.

The total yield, based on the reactant triethyltin chloride and tin tetrachloride, amounted to 64% of theory. When operating on a larger scale, recycling can naturally be carried out more often, whereby yields of 80 to 90% can be obtained.

Example 4

241 g. triethyltin chloride was diluted with 1 liter methanol, mixed with 200 cc. 50% potassium hydroxide and refluxed for 2 hours. The resultant precipitate was filtered off and washed with methanol. The filtrate was mixed with 5 liters water, extracted with ether, the ether distilled off and the residue crystallized in a cold mixture. By filtration of the crystal slurry and recrystallization from ether, there was obtained pure triethyltin hydroxide, F. P. 42° to 44° C., in a yield of 98 g.=43% of theory. The portion remaining fluid in the cold mixture consisted of triethyltin chloride, tetraethyltin and uncrystallized triethyltin hydroxide.

The insoluble precipitate formed during saponification together with the portion remaining fluid was shaken with 200 cc. methylene chloride and 300 cc. conc. HCl for ½ hour. Finally the aqueous layer was removed, the solvent was distilled off and the resultant residue heated for 3 hours at 200° to 210° C. By subsequent vacuum distillation, there was recovered 82 g. triethyltin chloride, so that the total yield is increased to 62%.

That which is claimed is:

1. In the method for the preparation of triorganotin hydroxide and hexaorganodistannoxane by the saponification of an organotin halide mixture comprising tetraorganotin and triorganotin halide, the organic radicals attached to tin being selected from the group consisting of alkyl radicals of from 1 to 12 inclusive carbon atoms and aryl radicals of from 6 to 10 inclusive carbon atoms, the improvement which comprises (1) separating the insoluble precipitate from the saponification product, (2) separating a fraction containing any unsaponified triorganotin halide and tetraorganotin from the liquid portion of the saponification product, (3) contacting the aforesaid insoluble precipitate with HCl and separating the organotin chlorides thereby produced, (4) mixing said organotin chlorides with the aforesaid unsaponified triorganotin halide-tetraorganotin fraction and heating the mixture at a temperature of from 150° to 240° C., (5) saponifying the reaction product from (4), and (6) separating a product selected from the group consisting of triorganotin hydroxide and hexaorganodistannoxane.

2. In the method for the preparation of hexaalkyldistannoxane by the saponification of an alkyl tin halide mixture comprising tetraalkyltin and trialkyltin chloride, the alkyl radicals in the aforesaid compounds being of from 1 to 12 inclusive carbon atoms the improvement which comprises (1) separating the insoluble precipitate from the saponification product, (2) separating a fraction containing any unsaponified trialkyltin chloride and tetraalkyltin from the liquid portion of the saponification product, (3) contacting the aforesaid insoluble precipitate with HCl and separating the alkyltin chlorides thereby produced, (4) mixing said alkyltin chlorides from (3) with the afore unsaponified trialkyltin chloride-tetraalkyltin fraction and heating the mixture at a temperature of from 200° to 220° C., (5) saponifying the reaction product from (4), and (6) separating hexaalkyldistannoxane so produced.

3. The method in accordance with claim 2 wherein the alkyl radicals attached to tin are butyl radicals.

4. The method of claim 2 wherein the saponification is carried out by heating the alkyltin chloride reaction mixtures with alcoholic alkali metal hydroxide.

5. The method of claim 2 wherein the HCl is employed in the form of aqueous HCl at a concentration of from 15 to 40 percent by weight.

6. The method in accordance with claim 2 wherein the HCl is employed in the form of anhydrous gaseous HCl.

7. In the method for the preparation of trialkyltin hydroxide and hexaalkyldistannoxane by the saponification of an alkyl tin halide mixture comprising tetraalkyltin and trialkyltin chloride, the alkyl radicals in the aforesaid compounds being of from 1 to 4 inclusive carbon atoms, the improvement which comprises (1) separating the insoluble precipitate from the saponification product, (2) separating a fraction containing any unsaponified alkyltin chlorides and tetraalkyltin from the liquid portion of the saponification product, (3) contacting the aforesaid insoluble precipitate with HCl and separating the alkyltin chlorides thereby produced, (4) mixing said alkyltin chlorides with the aforesaid unsaponified trialkyltin chloride-tetraalkyltin fraction, adding to said mixture a sufficient amount of a tin compound selected from the group consisting of tetraalkyltin, dialkyltin dichloride, alkyltin trichloride and tin tetrachloride so that the resulting mixture has a chlorine to tin ratio of about 1, and heating the final mixture at a temperature of from 150° to 240° C., (5) saponifying the reaction product from (4) in a homogeneous phase by contacting it with an alkali metal hydroxide in the presence of an alcoholic mutual solvent, and (6) separating the reaction products.

8. The method of claim 7 wherein the mixture of materials defined in step (4), is heated at 200° to 220° C.

No references cited.